United States Patent
Kramer et al.

(10) Patent No.: US 10,397,985 B2
(45) Date of Patent: Aug. 27, 2019

(54) PLASTICS REAR WINDOW HAVING A REAR WINDOW HEATER AND METHOD FOR PRODUCING THE SAME

(71) Applicant: Webasto SE, Stockdorf (DE)

(72) Inventors: Andrea Kramer, Stockdorf (DE); Jörg Löffler, Stockdorf (DE); Kevin Zirnsak, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 789 days.

(21) Appl. No.: 14/721,673

(22) Filed: May 26, 2015

(65) Prior Publication Data

US 2015/0351161 A1 Dec. 3, 2015

(30) Foreign Application Priority Data

May 27, 2014 (DE) .................. 10 2014 107 480

(51) Int. Cl.
*B60J 1/00* (2006.01)
*B60J 1/18* (2006.01)
*H05B 3/86* (2006.01)

(52) U.S. Cl.
CPC ................ *H05B 3/86* (2013.01); *B60J 1/002* (2013.01); *B60J 1/18* (2013.01); *H05B 2203/005* (2013.01); *H05B 2203/011* (2013.01); *H05B 2203/013* (2013.01)

(58) Field of Classification Search
CPC .... B60J 1/002; B60J 1/18; H05B 3/86; H05B 2203/005; H05B 2203/011; H05B 2203/013

USPC .................... 219/202, 203; 427/58
See application file for complete search history.

(56) References Cited

U.S. PATENT DOCUMENTS

| | | | | |
|---|---|---|---|---|
| 3,327,093 A | * | 6/1967 | Hager, Jr. ............... | F24D 13/02 219/455.12 |
| 3,484,583 A | * | 12/1969 | Shaw, Jr. .................. | B60J 1/02 219/203 |
| 3,928,748 A | * | 12/1975 | Sauer ................ | B32B 17/10036 144/134.1 |
| 4,637,862 A | * | 1/1987 | Eesley .................... | C23C 18/14 205/109 |
| 4,845,344 A | * | 7/1989 | Price ..................... | B64C 1/1492 219/203 |
| 5,481,400 A | * | 1/1996 | Borden ............. | H01L 31/02164 219/203 |
| 5,543,601 A | * | 8/1996 | Bartrug ............. | B32B 17/10036 219/203 |
| 5,766,739 A | * | 6/1998 | Funaki ..................... | H05B 3/84 219/203 |

(Continued)

FOREIGN PATENT DOCUMENTS

| | | |
|---|---|---|
| CN | 101977863 A | 2/2011 |
| DE | 928310 | 5/1955 |

(Continued)

*Primary Examiner* — Dana Ross
*Assistant Examiner* — Joe E Mills, Jr.
(74) *Attorney, Agent, or Firm* — Quarles & Brady LLP

(57) ABSTRACT

A rear window of a motor vehicle includes a window pane body made of plastics and provided with a rear window heater. The window pane body includes grooves at at least one of its two large faces. The grooves are at least partially filled with a strip conductor, wherein the strip conductors form the rear window heater.

7 Claims, 1 Drawing Sheet

(56) References Cited

U.S. PATENT DOCUMENTS

| | | | | |
|---|---|---|---|---|
| 5,858,496 A * | 1/1999 | Fisher | ............... | H05B 3/86 219/203 |
| 7,265,322 B2 * | 9/2007 | Aengenheyster | ............... | B29C 45/14811 219/203 |
| 7,781,705 B2 * | 8/2010 | Weiss | ............... | H05B 3/84 219/202 |
| 8,895,897 B2 * | 11/2014 | Dixon | ............... | H05B 3/84 219/201 |
| 2003/0042045 A1 * | 3/2003 | Koskenmaki | ............... | H05B 3/286 174/261 |
| 2003/0102465 A1 * | 6/2003 | Nagai | ............... | C03C 8/18 252/500 |
| 2006/0186104 A1 * | 8/2006 | Winter | ............... | H05B 3/84 219/203 |
| 2006/0292938 A1 * | 12/2006 | Schwenke | ............... | H05B 3/84 439/876 |
| 2009/0321407 A1 * | 12/2009 | Dixon | ............... | H05B 3/86 219/203 |
| 2011/0174796 A1 * | 7/2011 | Sterling | ............... | H05B 3/84 219/203 |
| 2012/0103961 A1 * | 5/2012 | Offermann | ............... | H05B 3/84 219/203 |
| 2013/0082043 A1 * | 4/2013 | McCarthy | ............... | H05B 3/84 219/203 |
| 2013/0213949 A1 * | 8/2013 | Lisinski | ............... | H05B 3/84 219/203 |
| 2014/0251975 A1 * | 9/2014 | Fawcett | ............... | H05B 3/86 219/203 |
| 2014/0374401 A1 * | 12/2014 | Nakagawa | ............... | H05B 3/86 219/203 |
| 2015/0014170 A1 * | 1/2015 | Naisby | ............... | B01L 3/502707 204/600 |
| 2015/0229030 A1 * | 8/2015 | Dai | ............... | H01Q 15/0013 219/203 |

FOREIGN PATENT DOCUMENTS

| | | |
|---|---|---|
| DE | 60206641 T2 | 6/2006 |
| EP | 2275389 A2 | 1/2011 |
| JP | 2014-046771 A | 3/2014 |

* cited by examiner

PLASTICS REAR WINDOW HAVING A REAR WINDOW HEATER AND METHOD FOR PRODUCING THE SAME

CROSS REFERENCE TO RELATED APPLICATION

This application claims the priority benefit of German Patent Application No. 10 2014 107 480.7 filed on May 27, 2014, which is fully incorporated herein by reference.

STATEMENT REGARDING FEDERALLY SPONSORED RESEARCH OR DEVELOPMENT

Not applicable.

FIELD OF THE INVENTION

The invention relates to a rear window of a motor vehicle having a heater, and to a method for producing the same.

BACKGROUND OF THE INVENTION

Such a rear window of a motor vehicle is known from practice and constitutes a rear look-through region of an occupant cell in a passenger car. The rear window can include a window pane body being manufactured from a plastics material. In order to prevent that the rear window ices up, the window pane body can be provided with a rear window heater.

It is further known to join rear window heaters of plastics window panes to a plastics window pane body via a thermoformed supporting film. This is effected in that strip conductors are applied onto the supporting film and in that the supporting film is subsequently backed with plastics by way of back injection molding for forming the window pane body.

Alternatively, it is known to apply strip conductors of a rear window heater onto a side of a plastics window pane body facing a vehicle interior by employing a screen printing method. Since, however, the plastic has rather bad heat conductivity properties and an outer side of the window pane body will usually be icy, this solution is often insufficient for the imposed requirements. If the strip conductors were, however, attached at the outer side of the window pane body facing away from the vehicle environment, they would not be adequately protected against damage and against corrosion on grounds of environmental influences.

SUMMARY OF THE INVENTION

It is the object of the invention to create a rear window of a motor vehicle being provided with a rear window heater that is protected to an adequate degree, as well as a method for producing the rear window. This object is attained in one embodiment by a rear window having a plastics window pane body. Grooves are envisaged in the window pane body with strip conductors arranged in the grooves in a protected manner. The strip conductors form the rear window heater. Advantageously, the strip conductors are embedded into grooves of the plastics window pane body and are in this way protected against mechanical damage.

In a preferred embodiment of the rear window according to the invention, the strip conductors are formed from an electrically conductive paste. Said paste can in particular be introduced into the grooves by way of a printing method, for example by way of an inkjet or screen printing method.

In a particularly light-weight embodiment of the rear window according to the invention, the plastics window pane body is manufactured from a polycarbonate material.

The grooves in the plastics window pane body can either be molded while the window pane body is being produced in a molding tool or also after the window pane body has been produced, by way of corresponding material removal, for example using a stain.

In order to protect both the plastics window pane body and the strip conductors against damage and against environmental influences, the window pane body, at the large face that is provided with the grooves, can be provided with a hard coat, in particular with a scratch resistance coating. Preferably, the strip conductors are covered by the scratch resistance coating.

For avoiding reflections, the grooves preferably each have a flank angle with respect to the plane of the window pane body of approximately 45° to 65°, preferably of approximately 55°.

Expediently, the rear window according to the invention is arranged at the outer side of the plastics window pane body, which faces a vehicle environment. Hence, the rear window heater takes effect at the side of the rear window at which ice buildup can usually occur.

Subject-matter of the invention is also a method for producing a rear window of a motor vehicle. In this method, a plastics window pane body is molded in a molding tool. Moreover, grooves are formed at at least one of the two large faces of the plastics window pane body. Strip conductors are introduced into the grooves.

The strip conductors are preferably formed from a paste, in particular from a silver paste or the like, and can be introduced into the grooves by way of a printing method. For example, the printing method is an ink jet or a screen printing method.

The grooves, which are molded in the plastics window pane body, can be molded during the process, while the plastics window pane body is being molded in the molding tool; that means a hollow space of the molding tool, in which the plastics window pane body is molded, has a profile that is negative with respect to the grooves.

Alternatively, it is also possible, however, to produce the grooves by way of material removal after the plastics window pane body has been demolded from the molding tool. This is for example effected using a laser or also by way of a machining method.

In an advantageous embodiment of the method according to the invention, the plastics window pane body, which is preferably manufactured from a polycarbonate material, at the very least at the side of the grooves, is provided with a hard coat or with a scratch resistance coating, for increasing its life span. The strip conductors can be covered by the scratch resistance coating. In this case, the strip conductors are introduced into the grooves before the scratch resistance coating is put on. Alternatively, it is, however, also conceivable to form the scratch resistance coating at the relevant large face of the plastics window pane body before the strip conductors are introduced into the grooves.

Further advantages and advantageous configurations of the subject-matter of the invention can be taken from the description, from the drawing and from the claims.

BRIEF DESCRIPTION OF THE DRAWINGS

One exemplary embodiment of a rear window according to the invention is illustrated in a schematically simplified way in the drawing and it, as well as a production method, will be explained in more detail in the following description. In the figures.

DETAILED DESCRIPTION OF AN EMBODIMENT

Figure 1:
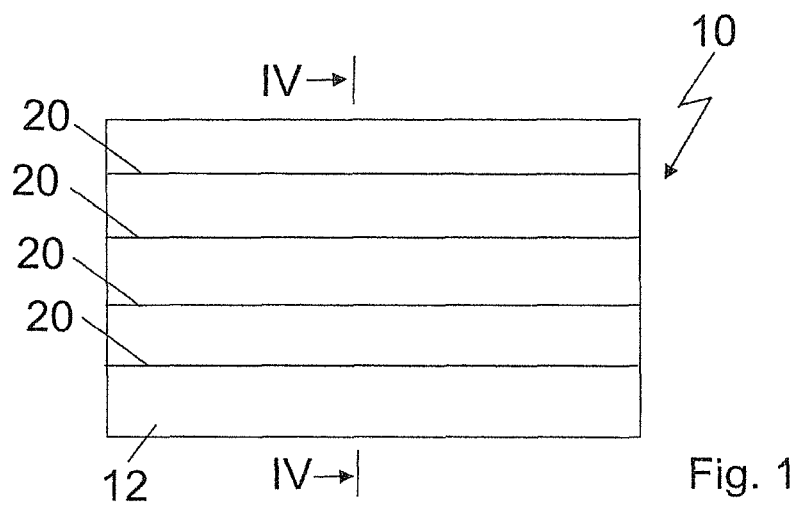
FIG. 1 shows a view from above onto a rear window according to the invention.
Figure 4:
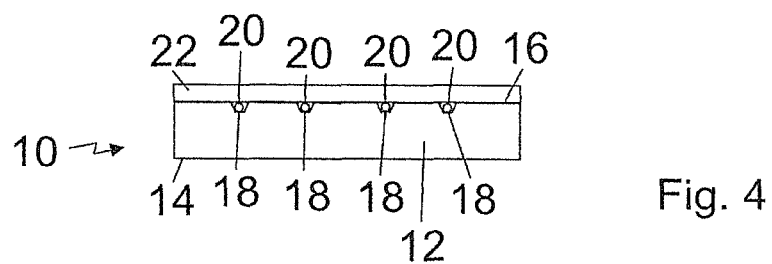
FIG. 4 shows a section through the finished rear window along line IV-IV in FIG. 1.

In FIGS. 1 and 4, a rear window 10 of a passenger car is illustrated, which window can either be utilized with a fixed-roof or also with a displaceable top of a convertible vehicle. The rear window 10 comprises a window pane body 12, which is manufactured from a polycarbonate material, that means from plastics.

The window pane body 12 has an inner side 14, which faces a vehicle interior, and an outer side 16, which faces the vehicle environment. At the large face constituting the outer side 16, the window pane body 12 includes channels or grooves 18, which extend over the width of the rear window 10 in the transverse direction of the relevant vehicle. The grooves 18 each have flank angles with respect to the plane of the window pane body 12 of approximately 55°. Hence, any reflections can effectively be dealt with.

The grooves 18 each receive one strip conductor 20, respectively, which consists of a silver paste being applied by way of a screen printing method. The strip conductors 20, which are connected to an electricity supply not being illustrated in more detail via bus bars that are formed at the lateral edges of the window pane body 12, constitute a rear window heater, with the aid of which misting or icing-up of the rear window 10 can be prevented.

In order to protect, on the one hand, the window pane body 12 and, on the other hand, the strip conductors 20 against damage and/or corrosion, the outer side 16 of the window pane body 12 is provided with a hard coat or scratch resistance coating 22.

The above-described rear window 10 is produced in the manner that is described in the following.

Figure 2:
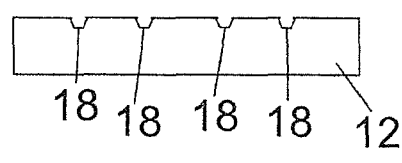
FIG. 2 shows a section through a window pane body of the rear window.
Figure 3:
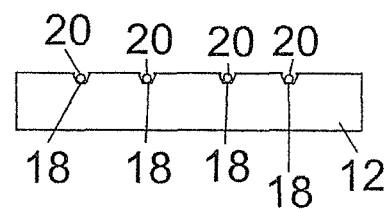
FIG. 3 shows a section through the window pane body where the strip conductors have been applied.

In a first production step, the window pane body 12 is molded in a molding tool having a corresponding hollow space. Here, the grooves 18 are simultaneously molded; that means the hollow space of the molding tool corresponds to the window pane body 12 being provided with the grooves 18 (cf. FIG. 2).

After having demolded the window pane body 12 from the molding tool, the window pane body 12 is introduced into a screen printing device. The strip conductors 20, which consist of a silver paste, are introduced into the grooves 18 there. Subsequently, the unit consisting of the window pane body 12 and of the strip conductors 20 is dried.

In order to make the rear window 10 resistant to wear, the scratch resistance coating 22 is applied onto the outer side 16 of the window pane body 12 in the following. This can be effected by way of a painting method or also by way of a laminating method. The scratch resistance coating 22 covers the strip conductors 20 and, hence, also the grooves 18.

The invention claimed is:

1. A rear window of a motor vehicle, said rear window comprising:
   a plastic window pane body having grooves at at least one of two large faces, the grooves each having a flank angle with respect to the plane of the window pane body of approximately 45° to 65°; and
   strip conductors at least partially filling each of said grooves and forming a rear window heater;
   wherein the strip conductors are an electrically conductive paste; and wherein the strip conductors are imprinted.

2. The rear window according to claim 1, in which the window pane body is a polycarbonate material.

3. The rear window according to claim 1, in which the grooves are molded into the window pane body is being produced in a molding tool.

4. The rear window according to claim 1, in which the grooves are produced by removing material from the window pane body.

5. The rear window according to claim 1, in which the window pane body is provided with a scratch resistance coating at the large face provided with the grooves.

6. The rear window according to claim 5, in which the strip conductors are covered by the scratch resistance coating.

7. The rear window according to claim 1, in which the window pane body, in respect of the motor vehicle, includes an inner side, which faces a vehicle interior, and an outer side, which faces a vehicle environment, and in that the rear window heater is arranged at the outer side.

* * * * *